United States Patent
Wen et al.

(10) Patent No.: US 9,350,003 B2
(45) Date of Patent: May 24, 2016

(54) BATTERY MODULE WITH FIXING AND BURGLARPROOF FUNCTIONS

(71) Applicant: Aleees Eco Ark Co. Ltd., Taoyuan County (TW)

(72) Inventors: Chung-Wei Wen, Taoyuan County (TW); Ching-An Shu, Taoyuan County (TW)

(73) Assignee: ALEEES ECO ARK CO. LTD., Taoyuan County (TW)

( * ) Notice: Subject to any disclaimer, the term of this patent is extended or adjusted under 35 U.S.C. 154(b) by 108 days.

(21) Appl. No.: 14/356,559

(22) PCT Filed: Nov. 7, 2012

(86) PCT No.: PCT/CN2012/084210
§ 371 (c)(1),
(2) Date: May 6, 2014

(87) PCT Pub. No.: WO2013/067931
PCT Pub. Date: May 16, 2013

(65) Prior Publication Data
US 2014/0295234 A1    Oct. 2, 2014

Related U.S. Application Data

(60) Provisional application No. 61/556,388, filed on Nov. 7, 2011.

(51) Int. Cl.
*H01M 2/10*    (2006.01)
*B60K 1/04*    (2006.01)
*B62D 47/02*    (2006.01)

(52) U.S. Cl.
CPC .............. *H01M 2/1083* (2013.01); *B60K 1/04* (2013.01); *B60K 2001/0438* (2013.01); *B60K 2001/0461* (2013.01); *B60Y 2200/143* (2013.01); *B62D 47/02* (2013.01); *H01M 2220/20* (2013.01); *Y02T 90/124* (2013.01)

(58) Field of Classification Search
CPC .. H01M 2/1083; H01M 2220/20; B60K 1/04; B60K 2001/0438; B62D 47/02; B60Y 2200/143
USPC .......................................................... 429/96
See application file for complete search history.

(56) References Cited

U.S. PATENT DOCUMENTS

| 4,808,058 A | 2/1989 | Carney et al. |
| 6,095,270 A | 8/2000 | Ishikawa |

(Continued)

FOREIGN PATENT DOCUMENTS

| CN | 201283929 | 8/2009 |
| CN | 201345374 | 11/2009 |

(Continued)

*Primary Examiner* — Patrick Ryan
*Assistant Examiner* — Aaron Greso
(74) *Attorney, Agent, or Firm* — Kirton McConkie; Evan R. Witt

(57) ABSTRACT

A battery module for an electric vehicle includes an external case, a battery box, a fixing mechanism, and a rotatable pull tab. The external case is fixed in the electric vehicle, and includes an accommodation space and a first fixing part. The battery box is detachably installed in the accommodation space. The fixing mechanism is disposed on the battery box. When the battery box is installed in the accommodation space, the fixing mechanism engages or disengages the first fixing part to selectively lock or unlock the battery box. When the battery box is locked, the battery box is securely fixed in the accommodation space. When the battery box is unlocked, the battery box is removable from the accommodation space. The rotatable pull tab is detachably inserted into the fixing mechanism. By rotating the rotatable pull tab the battery box is selectively locked or unlocked.

11 Claims, 7 Drawing Sheets

(56) References Cited

U.S. PATENT DOCUMENTS

| | | | |
|---|---|---|---|
| 6,117,587 | A | 9/2000 | Kitami et al. |
| 6,624,610 | B1 | 9/2003 | Ono et al. |
| 2009/0000835 | A1* | 1/2009 | Jones .................. B60K 1/04 180/65.1 |
| 2009/0266042 | A1 | 10/2009 | Mooney et al. |
| 2011/0254654 | A1 | 10/2011 | Lo et al. |

FOREIGN PATENT DOCUMENTS

| | | |
|---|---|---|
| CN | 201405719 | 2/2010 |
| CN | 201405719 Y | 2/2010 |
| CN | 102191893 | 9/2011 |
| DE | 102009052525 | 5/2011 |
| EP | 0822134 | 2/1998 |
| FR | 2956072 | 8/2011 |
| JP | H0480833 | 3/1992 |
| JP | H1045076 | 2/1998 |
| JP | H1092405 | 4/1998 |
| JP | H11115504 | 4/1999 |
| JP | H11-208287 | 8/1999 |
| JP | H11208287 | 8/1999 |
| JP | 2000253591 | 9/2000 |
| TW | 478488 | 3/2002 |
| TW | M400420 | 3/2011 |

* cited by examiner

BATTERY MODULE WITH FIXING AND BURGLARPROOF FUNCTIONS

FIELD OF THE INVENTION

The present invention relates to a battery module, and more particularly to a battery module for an electric vehicle and with fixing and burglarproof functions.

BACKGROUND OF THE INVENTION

Recently, the world's energy source is gradually depleted. Moreover, with the increasing environmental consciousness and the popularity of environmental protection, the conventional gasoline vehicles are gradually replaced by electric vehicles. Consequently, the electric vehicles have become the popular transportation means for people in recent years.

Generally, the electric vehicle has a built-in chargeable battery for providing electric energy to power and drive the electric vehicle. According to the approaches of installing the chargeable battery, electric vehicles are usually divided into two types. In the first type electric vehicle, the chargeable battery is fixed in a vehicle body of the electric vehicle. For charging the chargeable battery of the first type electric vehicle, the user has to drive the electric vehicle to a charging station in order to charge the chargeable battery. In the second type electric vehicle, the chargeable battery is detachably installed in the electric vehicle. For charging the chargeable battery of the second type electric vehicle, the low-capacity chargeable battery within the electric vehicle is removed from the electric vehicle and replaced by a fully-charged chargeable battery without driving the electric vehicle to the charging station.

As is well known, the first type electric vehicle has some drawbacks. For charging the chargeable battery of the first type electric vehicle, it is necessary to drive the electric vehicle to the charging station. If the residual capacity of the chargeable battery is insufficient or the charging station is too far, the electric vehicle is possibly unable to be charged by the charging station. In other words, the utilization flexibility of the first type electric vehicle is low. Moreover, since the chargeable battery is fixed in the vehicle body, the overall cost of the first type electric vehicle is high. Consequently, the competition of this electric vehicle is low.

The use of the second type electric vehicle may solve the drawbacks of the first type electric vehicle. The chargeable battery of the second type electric vehicle is removable and replaceable. In other words, it is not necessary to drive the electric vehicle to the charging station to charge the chargeable battery. Consequently, the convenience of charging the electric vehicle is increased, and the utilization flexibility of the electric vehicle is enhanced. Recently, the dealers and manufacturers of the electric vehicles provide removable battery module for hire. Consequently, the selling price of the electric vehicle is reduced.

However, the second type electric vehicle still has some drawbacks. For example, if the battery module of the electric vehicle is pulled out very easily, the user may replace or maintain the battery module. In case that the user lacks the professional knowledge about the battery module, the user may get an electric shock during the process of replacing or maintaining the battery module. Moreover, since the weight of the battery module is very high, if the battery module can be easily pulled out from the electric vehicle without the need of using a special equipment or machine, the user is readily suffered from crush injury. Moreover, since the battery module is replaceable, the battery module is readily stolen. Moreover, if the battery module is not securely fixed in the vehicle body, the possibility of vibrating and rocking the battery module will be increased. Under this circumstance, the battery module may be damaged.

Therefore, there is a need of providing a battery module with fixing and burglarproof functions in order to avoid the above drawbacks.

SUMMARY OF THE INVENTION

The present invention provides a battery module with fixing and burglarproof functions. The battery module comprises an external case, a battery box, a fixing mechanism, and a rotatable pull tab. Since it is not easy to pull out the battery box from the accommodation space, the danger of easily changing the battery box is largely reduced, and the burglarproof efficacy of the battery box is enhanced. Moreover, during the process of driving the electric vehicle, the possibility of vibrating and rocking the battery box will be minimized, and the use life of the chargeable battery within the battery module will be increased.

In accordance with an aspect of the present invention, there is provided a battery module for an electric vehicle. The battery module includes an external case, a battery box, a fixing mechanism, and a rotatable pull tab. The external case is fixed in the electric vehicle, and includes an accommodation space and a first fixing part. The battery box is detachably installed in the accommodation space. The fixing mechanism is disposed on the battery box. When the battery box is installed in the accommodation space, the fixing mechanism is engaged with or disengaged from the first fixing part, so that the battery box is selectively in a locked status or an unlocked status. When the battery box is in the locked status, the battery box is securely fixed in the accommodation space. When the battery box is in the unlocked status, the battery box is removable from the accommodation space. The rotatable pull tab is detachably inserted into the fixing mechanism. By rotating the rotatable pull tab, a relationship between the fixing mechanism and the first fixing part is adjustable, so that the battery box is selectively in the locked status or the unlocked status. When the battery box is in the unlocked status, the battery box is removed from the accommodation space in response to an external force exerted on the rotatable pull tab.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
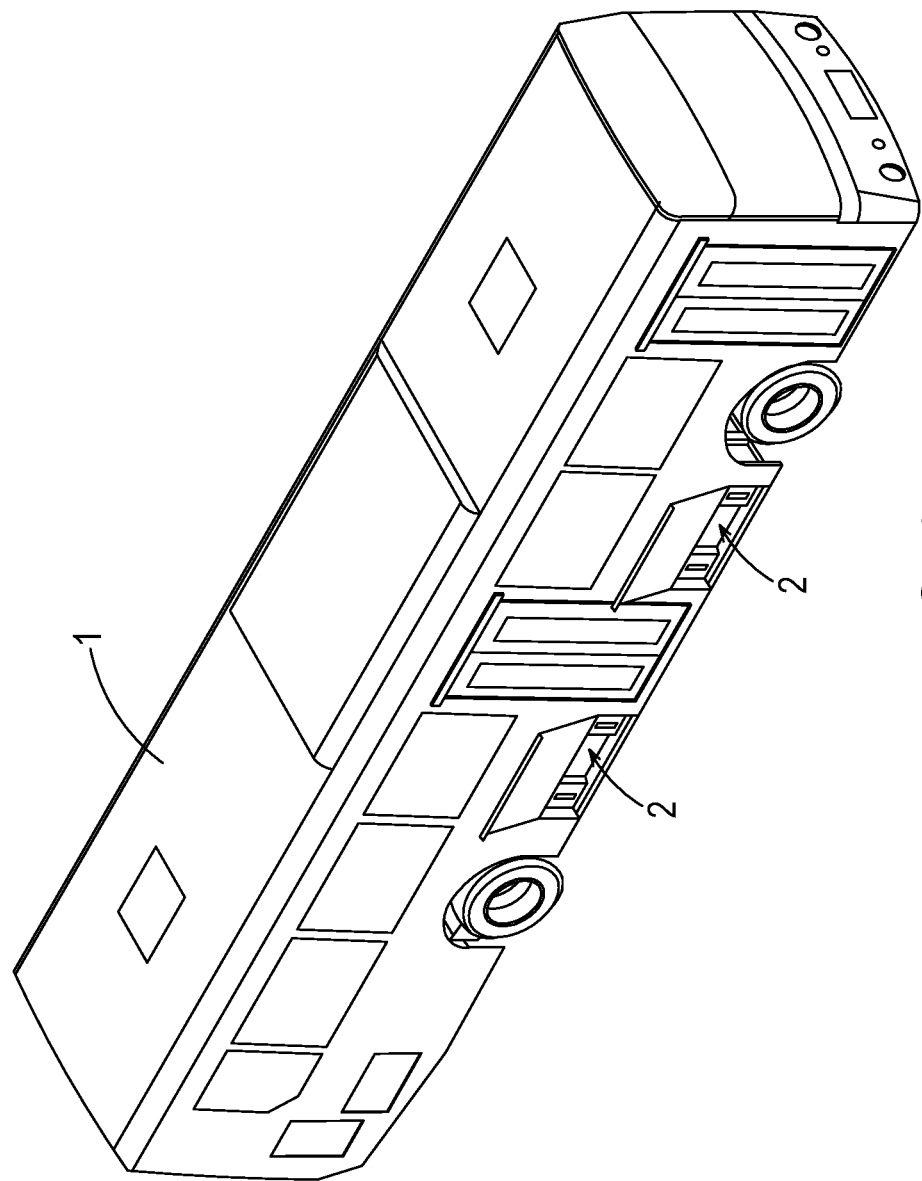
FIG. 1 schematically illustrates an electric vehicle with at least one battery module according to an embodiment of the present invention.
Figure 2:
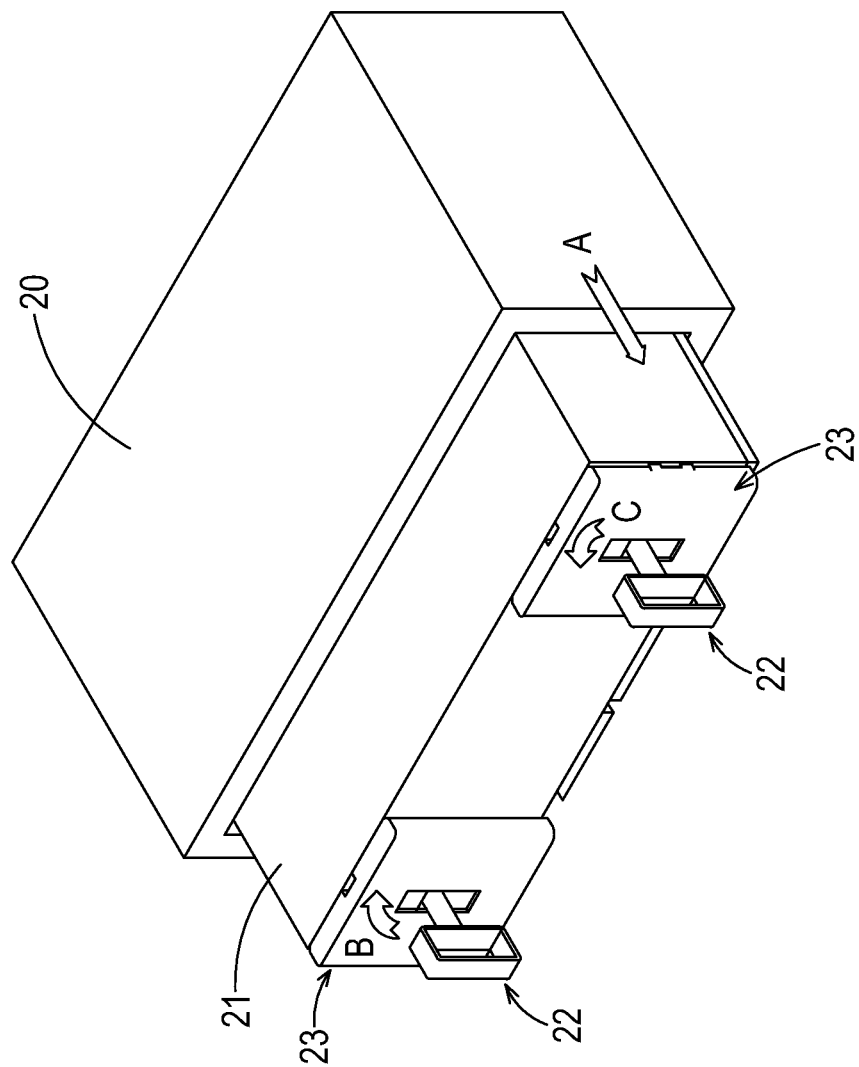
FIG. 2 schematically illustrates the battery module of the electric vehicle of FIG. 1.
Figure 3:
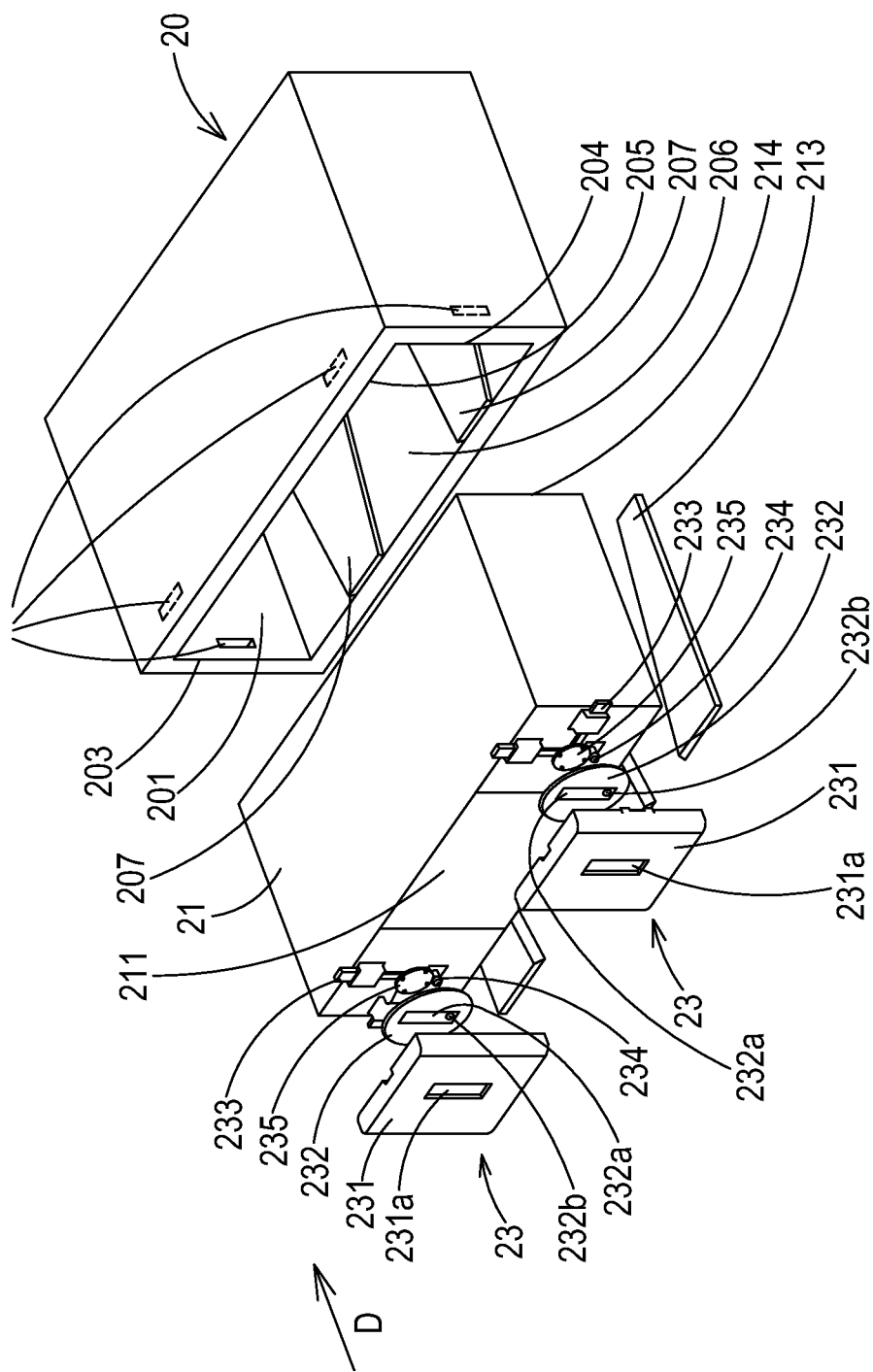
FIG. 3 is a schematic exploded view illustrating a portion of the battery module of FIG. 2.

Please refer to FIGS. 1~3. FIG. 1 schematically illustrates an electric vehicle with at least one battery module according to an embodiment of the present invention. FIG. 2 schematically illustrates the battery module of the electric vehicle of FIG. 1. FIG. 3 is a schematic exploded view illustrating a portion of the battery module of FIG. 2. As shown in FIGS. 1~3, the battery module 2 is applied to an electric vehicle. An example of the electric vehicle included but is not limited to an electric motor car or an electric scooter. In this embodiment, the electric vehicle is a large-sized electric bus 1.

The battery module 2 is installed in a vehicle body of the electric bus 1. For example, the battery module 2 is located at a lateral side of the vehicle body of the electric bus 1. In this embodiment, the battery module 2 comprises an external case 20, a battery box 21, at least one rotatable pull tab 22, and at least one fixing mechanism 23. The external case 20 is locked into the vehicle body of the electric bus 1. The external case 20 comprises an accommodation space 201 and a plurality of first fixing parts 202. The accommodation space 201 has a size matching the battery box 21 in order to accommodate the battery box 21. As shown in FIG. 3, the external case 20 comprises four first fixing parts 202. The four first fixing parts 202 are indentations that are formed in corresponding inner walls of the external case 20. One indentation 202 is formed in a left inner wall 203 of the external case 20, another indentation 202 is formed in a right inner wall 204 of the external case 20 (as is indicated as dotted lines), and the other two indentations 202 are formed in a top inner wall 205 of the external case 20 (as is indicated as dotted lines).

The battery box 21 is detachably installed in the accommodation space 201. When the battery box 21 is installed in the accommodation space 201, an outer surface 211 of the battery box 21 faces an exit of the accommodation space 201. Namely, the outer surface 211 of the battery box 21 faces an outer side of the external case 20. Moreover, the battery box 21 may contain at least one chargeable battery (not shown). In this embodiment, the battery module 2 comprises two fixing mechanisms 23. The two fixing mechanisms 23 are located at two sides of the outer surface 211 of the battery box 21, respectively. When the battery box 21 is installed in the accommodation space 201, the fixing mechanisms 23 may be engaged with or disengaged from the plural indentations 202 of the external case 20. By adjusting the relationship between the fixing mechanisms 23 and the plural indentations 202, the battery box 21 is selectively in a locked status or an unlocked status. In case that the battery box 21 is in the locked status, the battery box 21 is securely fixed in the accommodation space 201. In case that the battery box 21 is in the unlocked status, the battery box 21 may be removed from the accommodation space 201.

Each fixing mechanism 23 comprises an outer shell 231, a guiding disk 232, a plurality of second fixing parts 233, an elastic positioning post 234, and a rotatory disk 235. The plural second fixing parts 233 are disposed on the outer surface 211 of the battery box 21. Moreover, the plural second fixing parts 233 are located at the positions corresponding to the plural indentations 202 of the external case 20. An example of the second fixing part 233 includes but is not limited to an elongated pin. The pins 233 may be engaged with the corresponding indentations 202. The total number of the pins 233 of the two fixing mechanisms 23 and the locations of the pins 233 are determined according to the number and the locations of the indentations 202 of the external case 20. As shown in FIG. 3, each fixing mechanism 23 comprises two pins 233. Correspondingly, four pins 233 are disposed on the outer surface 211 of the battery box 21. Consequently, the four pins 233 may be engaged with the corresponding indentations 202.

The rotatory disk 235 is rotatably disposed on the outer surface 211 of the battery box 21. The rotatory disk 235 is connected with the two pins 233 through a connecting rod action. Upon rotation of the rotatory disk 235, the two pins 233 are simultaneously rotated relative to the outer surface 211 of the battery box 21. Consequently, the two pins 233 are partially protruded out of the outer surface 211 of the battery box 21 or the two pins 233 are not protruded out of the outer surface 211 of the battery box 21. After the battery box 21 is accommodated within the accommodation space 201, by rotating the rotatory disk 235, the pins 233 are rotated to be partially protruded out of the outer surface 211 of the battery box 21. Under this circumstance, the pins 233 are engaged with the corresponding indentations 202, and the battery box 21 is fixed in the accommodation space 201.

The elastic positioning post 234 is located adjacent to the rotatory disk 235, and disposed on the outer surface 211 of the battery box 21. An example of the elastic positioning post 234 is a rubbery elastomer or a spring. The guiding disk 232 rotatably covers the rotatory disk 235 for synchronously driving rotation of the rotatory disk 235. Moreover, the guiding disk 232 comprises a recess 232a and a perforation 232b. The perforation 232b is aligned with the elastic positioning post 234. Moreover, the elastic positioning post 234 may be penetrated through the perforation 232b. When the elastic positioning post 234 is penetrated through the perforation 232b, the elastic positioning post 234 is engaged with the perforation 232b, so that the rotatory disk 235 cannot be rotated. On the other hand, when the elastic positioning post 234 is detached from the perforation 232b (e.g. by a pressing action), the guiding disk 232 may be rotated to drive synchronous rotation of the rotatory disk 235. In this embodiment, the recess 232a is an elongated recess.

The outer shell 231 is fixed on the outer surface 211 of the battery box 21 for sheltering the guiding disk 232, at least a part of the pin 233, the elastic positioning post 234 and the rotatory disk 235. Due to the arrangement of the outer shell 231, the people who are not the original equipment manufacture or the specialized technicians cannot realize the inner components and the actions of the fixing mechanism 23. Since the inner components and the actions of the fixing mechanism 23 cannot be easily realized by the user, it is difficult for the user to remove the battery box 21 from the external case 20. Under this circumstance, the safety of the battery module 2 is enhanced. Moreover, the outer shell 231 further comprises a guiding slot 231a corresponding to the recess 232a. The size and shape of the guiding slot 231a match the size and shape of the recess 232a. That is, the guiding slot 231a is an elongated slot. Moreover, the long axis of the guiding slot 231a is perpendicular to a horizontal direction, and the short axis of the guiding slot 231a is in parallel with the horizontal direction.

Figure 4:
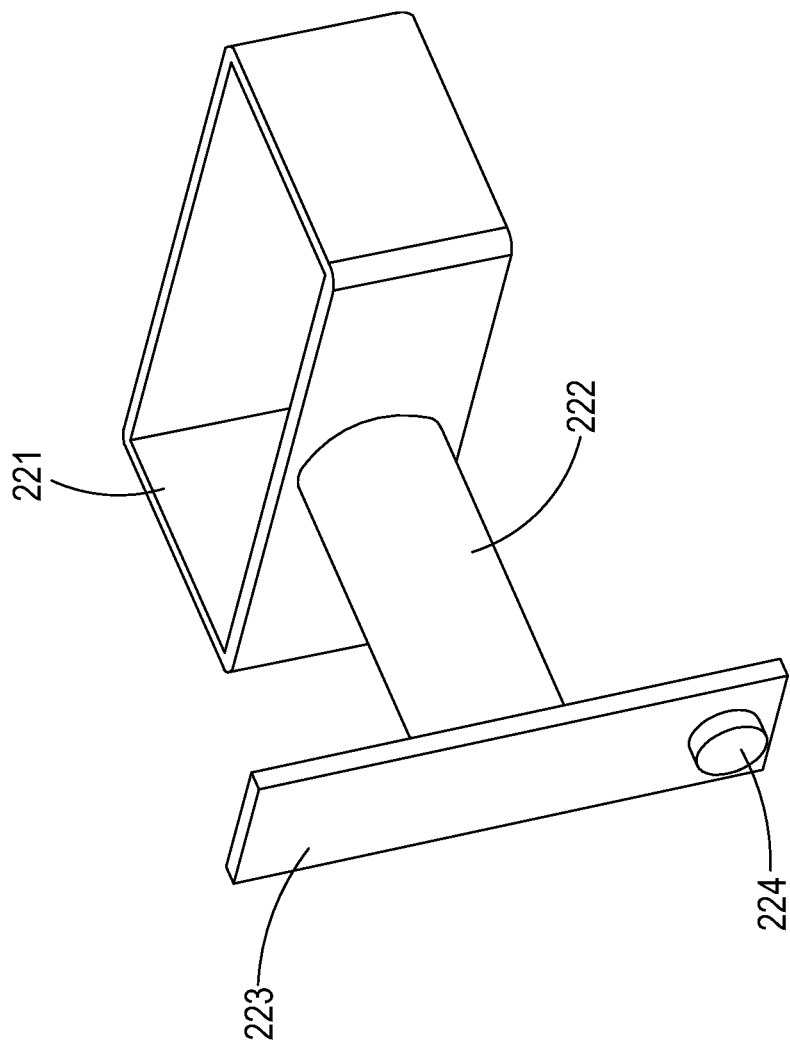
FIG. 4 is a schematic enlarged perspective view illustrating the rotatable pull tab of the battery module of FIG. 2.

Please refer to FIG. 4 and FIGS. 1~3. FIG. 4 is a schematic enlarged perspective view illustrating the rotatable pull tab of the battery module of FIG. 2. As shown in FIGS. 1~4, the number of the rotatable pull tabs 22 is determined according to the number of the fixing mechanisms 23. For example, the battery module comprises two rotatable pull tabs 22. The rotatable pull tabs 22 are detachably inserted into the corresponding fixing mechanisms 23 in order to adjust the relationship between the fixing mechanisms 23 and the first fixing parts (i.e. the indentations 202). Consequently, the battery box 21 is selectively in the locked status or the unlocked status. Moreover, when the battery box 21 is in the unlocked status, the battery box 21 may be removed from the accommodation space 201 in response to an external force exerted on the rotatable pull tabs 22.

In this embodiment, the rotatable pull tab 22 comprises a handle part 221, an insertion part 222, an engaging part 223, and a pressing part 224. The handle part 221 is connected with a first end of the insertion part 222, and has a ring-shaped structure to be held and operated by the user. Consequently, the rotatable pull tab 22 is correspondingly rotated. In this embodiment, the insertion part 222 is a pillar. The insertion part 222 is partially penetrated through the guiding slot 231a and partially disposed within the guiding slot 231a. The engaging part 223 is connected to a second end of the insertion part 222, and opposed to the handle part 221 with respect to the insertion part 222. Moreover, the size and shape of the engaging part 223 match the sizes and shapes of the guiding slot 231a and the recess 232a. Consequently, the engaging part 223 is an elongated slab. When the insertion part 222 is partially penetrated through the guiding slot 231a and partially disposed within the guiding slot 231a, the engaging part 223 is guided by the guiding slot 231a to be engaged with the recess 232a. Under this circumstance, once the insertion part 222 and the engaging part 223 are synchronously rotated with the handle part 221, the guiding disk 232 and the rotatory disk 235 are synchronously rotated with the engaging part 223. Consequently, the pins 233 are partially protruded out of the outer surface 211 of the battery box 21 or the two pins 233 are not protruded out of the outer surface 211 of the battery box 21. The pressing part 224 is disposed on the engaging part 223 and corresponds to the elastic positioning post 234. When the engaging part 223 is engaged with the recess 232a, if the elastic positioning post 234 is pressed by the pressing part 224, the elastic positioning post 234 is ejected out of the perforation 232b. Under this circumstance, the guiding disk 232 and the rotatory disk 235 are rotatable.

Figure 5:
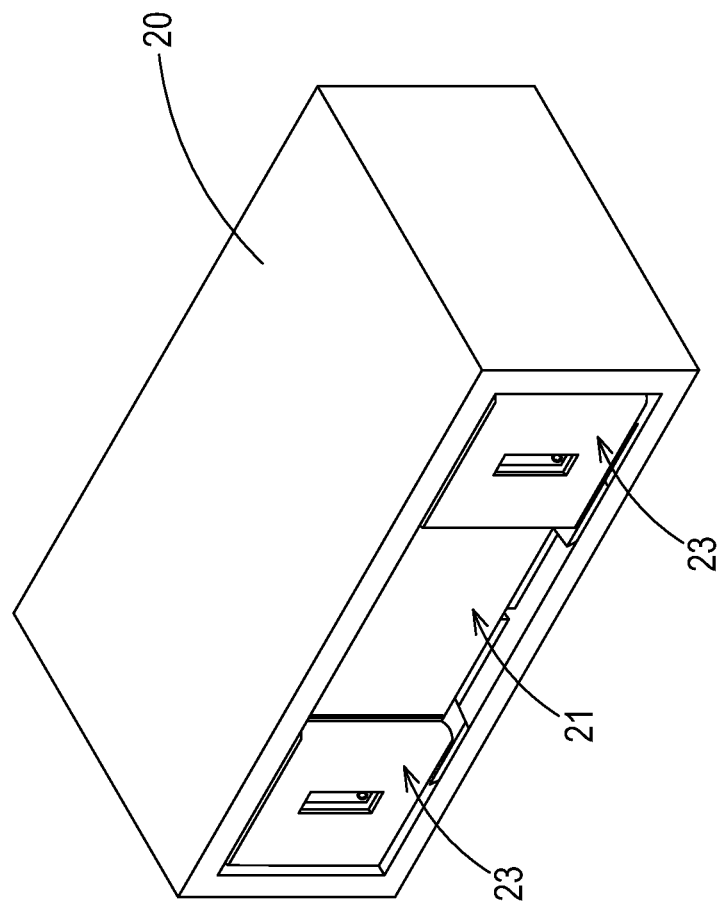
FIG. 5 is a schematic perspective view illustrating the battery module of FIG. 2 fixed in the accommodation space of the external case.

Hereinafter, the operations of the external case 20, the battery box 21, the rotatable pull tabs 22 and the fixing mechanisms 23 of the battery module 2 will be illustrated in more details. In this embodiment, the battery module 2 comprises two rotatable pull tabs 22 and two fixing mechanisms 23. Please refer to FIGS. 1~4 again. When the battery box 21 is in the locked status, the battery box 21 is fixed in the accommodation space 201 of the external case 20 (see FIG. 5). Meanwhile, the pins 233 are partially protruded out of the outer surface 211 of the battery box 21 and engaged with the corresponding indentations 202, the elastic positioning post 234 is penetrated through the perforation 232b, and the long axis of the guiding slot 231a is perpendicular to a horizontal direction. Under this circumstance, if the rotatable pull tabs 22 are not used, the battery box 21 cannot be switched from the locked status to the unlocked status. Consequently, the battery box 21 can be securely fixed in the accommodation space 201. During the process of driving the electric bus 1, the possibility of vibrating and rocking the battery box 21 will be minimized. Moreover, due to the arrangement of the rotatable pull tabs 22, the burglarproof efficacy of the battery box 21 will be enhanced.

For removing the battery box 21 from the accommodation space 201, the user has to prepare the two rotatable pull tabs 22 at first, and then the insertion parts 222 and the engaging parts 223 of the two rotatable pull tabs 22 are penetrated through the guiding slots 231a of the outer shell 231 to be accommodated within the outer shell 231. Under this circumstance, the engaging parts 223 are in parallel with the guiding slots 231a to be penetrated through the guiding slots 231a. That is, the engaging parts 223 are penetrated through the guiding slots 231a while the long axes of the engaging parts 223 are perpendicular to the horizontal direction. Consequently, the engaging parts 223 are guided by the guiding slots 231a to be directly engaged with the recesses 232a. Moreover, since the elastic positioning posts 234 are pressed by the pressing parts 224, the elastic positioning posts 234 are ejected out of the perforations 232b. Then, by applying external forces on the handle parts 221 of the two rotatable pull tabs 22, the rotatable pull tabs 22 are rotated by 90 degrees in the direction toward each other (e.g. in the rotating directions B and C as shown in FIG. 2). As the rotatable pull tabs 22 are rotated by 90 degrees, the insertion parts 222 and the engaging parts 223 are rotated by 90 degrees. Consequently, the guiding disk 232 and the rotatory disk 235 are synchronously rotated by 90 degrees with the engaging parts 223. Under this circumstance, the pins 233 are disengaged from the indentations 202, and no longer protruded out of the outer surface 211 of the battery box 21. Consequently, the battery box 21 is in the unlocked status. Since the engaging parts 223 are not in parallel with the guiding slots 231a, when the handle parts 221 of the two rotatable pull tabs 22 are rotated in response to the external forces and the battery box 21 is pulled out in the direction away from the external case 20 (e.g. in the direction A as shown in FIG. 2), the engaging parts 223 are contacted with the outer shell 231. Consequently, as the rotatable pull tabs 22 are pulled by the user, the battery box 21 is removed from the accommodation space 201. After the battery box 21 is removed from the accommodation space 201, the two rotatable pull tabs 22 are rotated to allow the engaging parts 223 and the guiding slots 231a to be in parallel with each other. Consequently, the rotatable pull tabs 22 may be pulled out from the fixing mechanisms 23.

For fixing the battery box 21 in the accommodation space 201 of the external case 20, the user may firstly push the battery box 21 into the accommodation space 201. Then, according to the above operating principles, the engaging parts 223 of the two rotatable pull tabs 22 are inserted into the two fixing mechanisms, the guiding disk 232 and the rotatory disk 235 are synchronously rotated with the engaging parts 223. As the rotatory disk 235 is rotated, the pins 233 are partially protruded out of the outer surface 211 of the battery box 21 and engaged with the corresponding indentations 202. Consequently, the battery box 21 is securely fixed in the accommodation space 201 of the external case 20. Next, the user may pull out the rotatable pull tabs 22 from the fixing mechanisms 23. Consequently, the elastic positioning posts 234 are penetrated through the perforations 232b, and the pins 233 are engaged with the perforations 232b.

Figure 6:
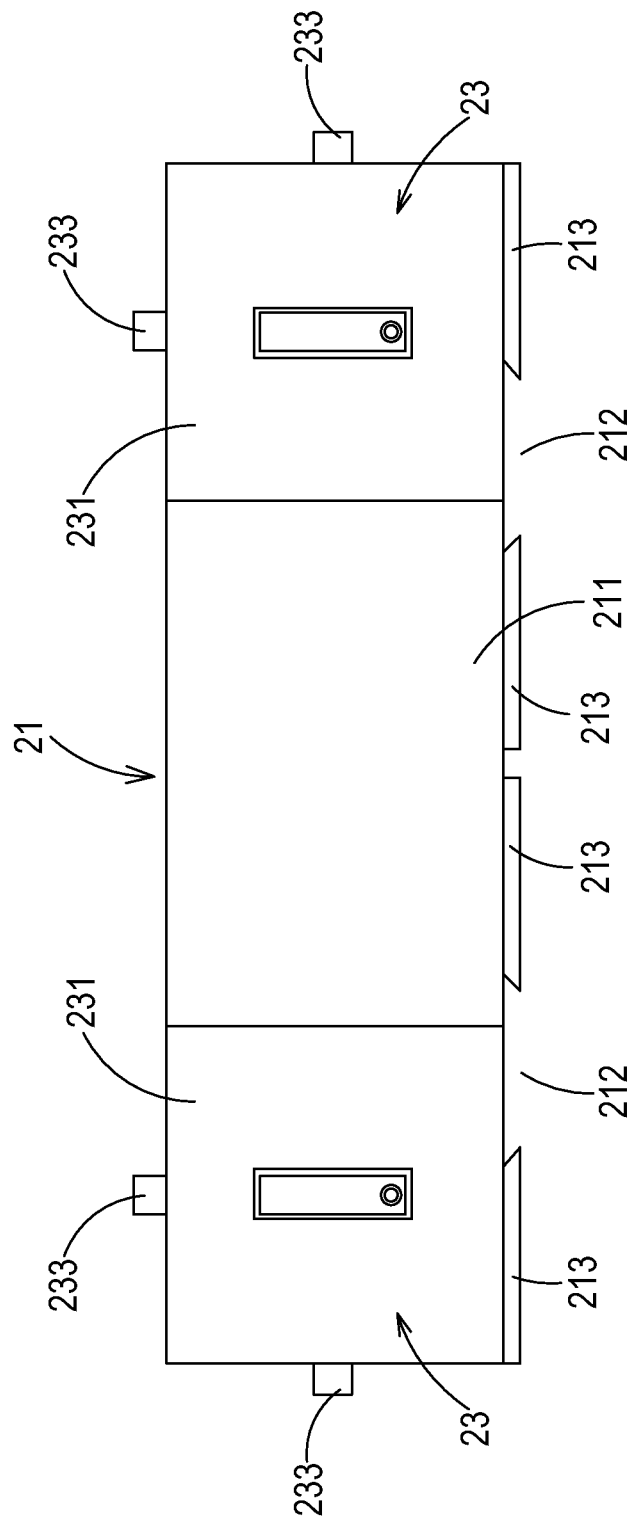
FIG. 6 is a schematic front view illustrating the battery box and the fixing mechanisms of FIG. 3 and taken along the direction D.
Figure 7:
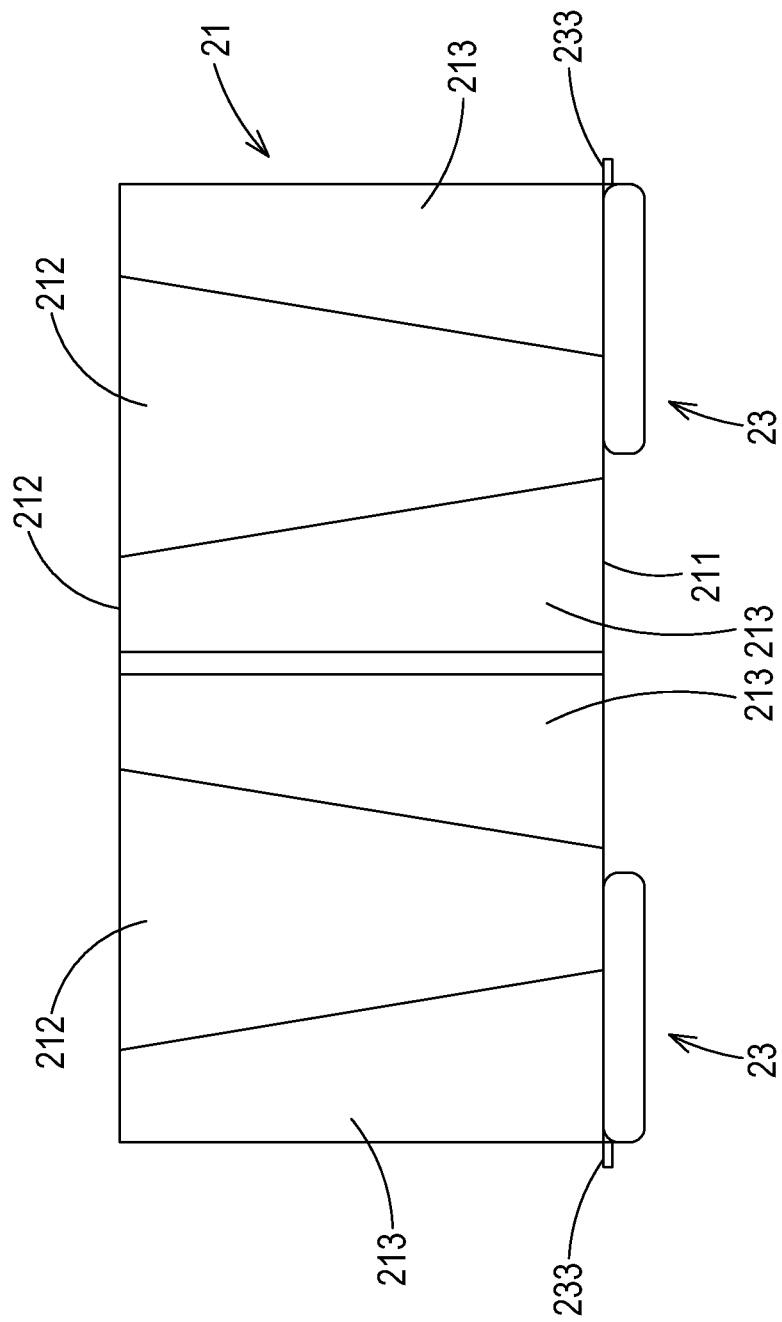
FIG. 7 is a schematic bottom view illustrating the battery box and the fixing mechanisms of FIG. 6.

Please refer to FIGS. 6~7 and FIGS. 2~5. FIG. 6 is a schematic front view illustrating the battery box and the fixing mechanisms of FIG. 3 and taken along the direction D. FIG. 7 is a schematic bottom view illustrating the battery box and the fixing mechanisms of FIG. 6. In some embodiments, the external case 20 comprises at least guiding rail 207. As shown in FIG. 3, the external case 20 comprises two guiding rails 207. The two guiding rails 207 are convexly formed on a bottom inner wall 206 of the external case 20 and disposed within the accommodation space 201. In this embodiment, the guiding rail 207 has an inverted trapezoid cross section. That is, the bilateral edges of the guiding rail 207 are inclined. Moreover, the width of the guiding rail 207 is gradually increased from the entrance of the accommodation space 201 to the inner portion of the accommodation space 201. Moreover, the battery box 21 further comprises at least one guiding groove 212 corresponding to the at least one guiding rail 207 of the external case 20. In this embodiment, the battery box 21 comprises two guiding grooves 212. The guiding groove 212 is formed in the bottom surface of the battery box 21. Moreover, the size and shape of the guiding groove 212 match the size and shape of the guiding rail 207. That is, the guiding groove 212 also has an inverted trapezoid profile. That is, the width of the guiding groove 212 is gradually increased from the outer surface 211 of the battery box 21 to an inner surface 214 of the battery box 21, which is opposed to the outer surface 211 of the battery box 21.

During the process of introducing the battery box 21 from the outside of the external case 20 into the accommodation space 201 of the external case 20, the width of the guiding rail 207 is gradually increased, and the width of the guiding groove 212 is gradually increased because the size and shape of the guiding groove 212 match the size and shape of the guiding rail 207. Consequently, it is easier to introduce the battery box 21 into the external case 20. Moreover, during the process of introducing the battery box 21 into the accommodation space 201, the guiding rail 207 is received in the guiding groove 212. Since the guiding rail 207 matches the guiding groove 212, the battery box 21 can be introduced into the accommodation space 201 more smoothly. Moreover, since the guiding rail 207 has the inverted trapezoid cross section and the guiding groove 212 has the inverted trapezoid profile, when the guiding rail 207 is introduced into the guiding groove 212, the guiding rail 207 is engaged with the guiding groove 212. Consequently, the battery box 21 can be fixed in the accommodation space 201 more securely.

In some embodiments, plural protrusion plates 213 (e.g. four protrusion plates 213) are separately formed on the bottom surface of battery box 21. Each of the protrusion plates 213 has an inverted trapezoid cross section. Moreover, the width of the protrusion plate 213 is gradually decreased from the outer surface 211 of the battery box 21 to the inner surface 214 of the battery box 21. Due to the arrangement of the plural protrusion plates 213, the at least one guiding groove 212 (e.g. two guiding grooves 212) will be defined. It is noted that the way of forming the guiding groove 212 is not restricted. For example, the guiding groove 212 may be a concave structure that is formed in the bottom surface of battery box 21.

From the above descriptions, the present invention provides a battery module with fixing and burglarproof functions. Due to the engagement between the fixing mechanism and the first fixing part of the external case, the battery box can be securely fixed in the accommodation space of the external case. Consequently, during the process of driving the electric vehicle, the possibility of vibrating and rocking the battery box will be minimized, and the use life of the chargeable battery within the battery module will be increased. Moreover, by rotating the rotatable pull tabs, the battery box may be selectively adjusted to be in the locked status or the unlocked status. Moreover, due to the arrangement of the rotatable pull tabs, it is not easy to pull out the battery box from the accommodation space. Consequently, the danger of easily changing the battery box is largely reduced, and the burglarproof efficacy of the battery box is enhanced. Moreover, since the guiding rail of the external case matches the guiding groove of the battery box, the battery box can be smoothly introduced into the accommodation space and the battery box can be fixed in the accommodation space more securely.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A battery module for an electric vehicle, the battery module comprising:
   an external case fixed in the electric vehicle, and comprising an accommodation space and a first fixing part;
   a battery box detachably installed in the accommodation space;
   a fixing mechanism disposed on the battery box, wherein when the battery box is installed in the accommodation space, the fixing mechanism is engaged with or disengaged from the first fixing part, so that the battery box is selectively in a locked status or an unlocked status, wherein when the battery box is in the locked status, the battery box is securely fixed in the accommodation space, wherein when the battery box is in the unlocked status, the battery box is removable from the accommodation space; and
   a rotatable pull tab detachably inserted into the fixing mechanism, wherein by rotating the rotatable pull tab, a relationship between the fixing mechanism and the first fixing part is adjustable, so that the battery box is selectively in the locked status or the unlocked status, wherein when the battery box is in the unlocked status, the battery box is removed from the accommodation space in response to an external force exerted on the rotatable pull tab;
   wherein the fixing mechanism further comprises a second fixing part corresponding to the first fixing part, wherein the second fixing part is disposed on an outer surface of the battery box, wherein the outer surface of the battery box faces an outer side of the external case, and the second fixing part is engageable with the first fixing part;
   wherein the first fixing part is an indentation, and the second fixing part is a pin;
   wherein the fixing mechanism further comprises:
      a rotatory disk rotatably disposed on the outer surface, and connected with the pin through a connecting rod action, wherein upon rotation of the rotatory disk, the pin is rotated relative to the outer surface, so that the pin is partially protruded out of the outer surface or the pin is not protruded out of the outer surface, wherein when the battery box is in the locked status, the pin is engaged with the indentation, wherein when the battery box is in the unlocked status, the pin is disengage from the indentation; and
      a guiding disk rotatably covering the rotatory disk for synchronously driving rotation of the rotatory disk, wherein the guiding disk comprises a recess.

2. The battery module as defined in claim 1, wherein the fixing mechanism further comprises an elastic positioning post, wherein the elastic positioning post is located adjacent to the rotatory disk and disposed on the outer surface.

3. The battery module as defined in claim 2, wherein the guiding disk further comprises a perforation corresponding to the elastic positioning post, wherein the elastic positioning post is penetrable through the perforation.

4. The battery module as defined in claim 3, wherein the guiding disk further comprises an outer shell, wherein the outer shell is disposed on the outer surface for sheltering the guiding disk, the pin, the elastic positioning post and the rotatory disk, wherein the outer shell comprises a guiding slot corresponding to the recess.

5. The battery module as defined in claim 4, wherein the rotatable pull tab comprises:
  an insertion part detachably inserted into the guiding slot;
  a handle part connected to a first end of the insertion part, wherein as the handle part is rotated, the rotatable pull tab is correspondingly rotated;
  an engaging part connected to a second end of the insertion part, wherein the insertion part is partially penetrated through the guiding slot and engaged with the recess of the guiding disk; and
  a pressing part disposed on the engaging part and corresponding to the elastic positioning post, wherein when the engaging part is engaged with the recess, if the elastic positioning post is pressed by the pressing part, the elastic positioning post is ejected out of the perforation.

6. The battery module as defined in claim 5, wherein the recess, the guiding slot and the engaging part have elongated profiles.

7. The battery module as defined in claim 5, wherein when the engaging part is penetrated through the guiding slot and the battery box is in the unlocked status, the engaging part is contacted with the outer shell, so that the battery box is removed from the accommodation space by pulling the rotatable pull tab.

8. The battery module as defined in claim 1, wherein the external case further comprises a guiding rail, wherein the guiding rail is formed on a bottom inner wall of the external case.

9. The battery module as defined in claim 8, wherein the battery box further comprises a guiding groove corresponding to the guiding rail, wherein the guiding groove is formed in a bottom surface of the battery box and matches with the guiding rail, so that the battery box is guided to be introduced into the accommodation space.

10. The battery module as defined in claim 9, wherein the guiding rail has an inverted trapezoid cross section, and a width of the guiding rail is gradually increased from an entrance of the accommodation space to an inner portion of the accommodation space.

11. The battery module as defined in claim 9, wherein the guiding groove has an inverted trapezoid profile, wherein a width of the guiding groove is gradually increased from the outer surface of the battery box to an inner surface of the battery box, wherein the inner surface is opposed to the outer surface.

* * * * *